LEWIS & BAILEY.
Hermetic Sealing.

No. 54,182.   Patented April 24, 1866.

Witnesses:   Inventors:

UNITED STATES PATENT OFFICE.

WM. K. LEWIS, OF BOSTON, AND J. W. BAILEY, OF WEST BROOKFIELD, MASSACHUSETTS.

IMPROVEMENT IN SEALING FRUIT-CANS AND OTHER VESSELS.

Specification forming part of Letters Patent No. 54,182, dated April 24, 1866.

*To all whom it may concern:*

Be it known that we, W. K. LEWIS, of Boston, in the county of Suffolk, and J. W. BAILEY, of West Brookfield, in the county of Worcester, both in the State of Massachusetts, have invented a new and Improved Mode of Hermetically Sealing Fruit and other Vessels; and we do hereby declare that the following description, taken in connection with the accompanying drawings, hereinafter referred to, forms a full and exact specification of the same, wherein we have set forth the nature and principles of our said improvements, by which our invention may be distinguished from all others of a similar class, together with such parts as we claim and desire to have secured to us by Letters Patent.

The present invention relates to a new and improved mode of "hermetically sealing," so called, cans, jars, or other vessels in which fruits, vegetables, meats, milk, or other articles of food or other substances are placed for the purpose of being preserved or kept from decomposition or decay; and it consists in placing the vessel containing the fruit or other article of food or other substance, whether in its natural state or "cooked," so termed, which it is desired to preserve, within an air-tight chamber or receiver, from which the air, as well as that of the vessel containing the fruit, &c., is then exhausted to the proper or requisite degree, producing a vacuum, or partially so, therein by means of an air-pump or other suitable apparatus therefor, and then hermetically sealing in any proper manner the vessel containing the fruit, &c., while in such vacuum, when, the vacuum being destroyed, the vessel so sealed is removed from the chamber in which it was placed and its contents either subjected or not to the action of heat in any of the ordinary modes now practiced therefor, according as may be desired or deemed best.

Figure 1:
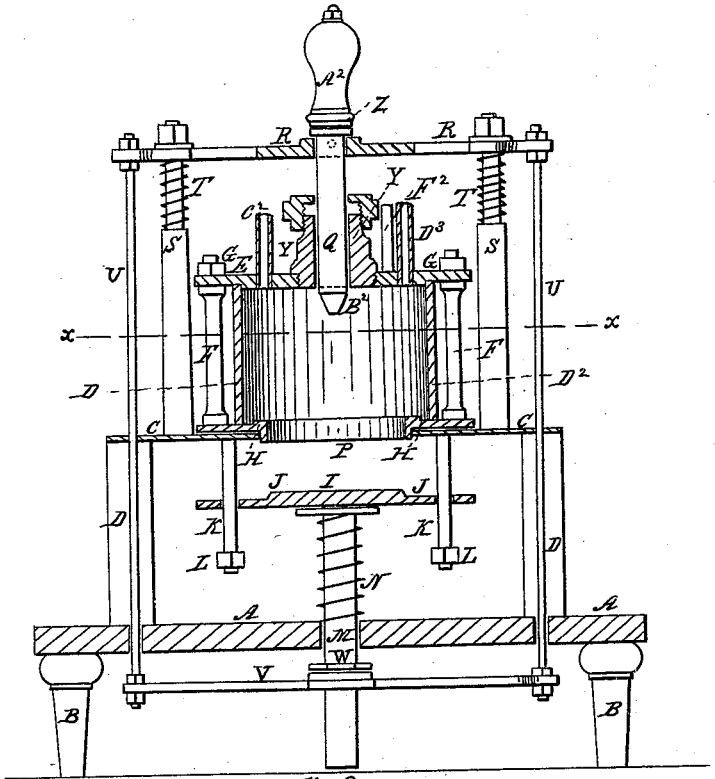
Figure 2:
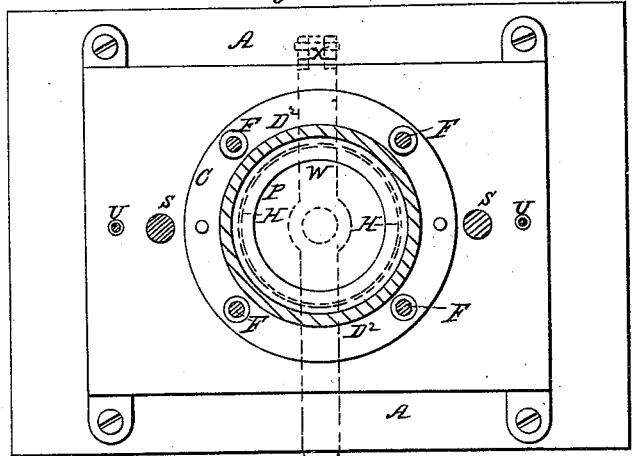

In the accompanying plate of drawings one form of apparatus for carrying out our new and improved mode of hermetically sealing cans, jars, or other vessels containing substances which it is desired to preserve from decomposition or decay is illustrated, Figure 1 being a central vertical section through the same, taken in the direction of its length, and Fig. 2 a horizontal section taken in the plane of the line $x\,x$, Fig. 1.

A in the drawings represents a table or platform supported upon four corner legs, B. Above this table A, and at a short distance therefrom, is another horizontal platform or plate, C, supported and attached to fixed uprights D of the lower platform, A.

$D^2$ is a cylindrical-shaped receiver or vessel, made of glass or other suitable material, and placed at the center of the upper platform, C, on which its lower end rests and is secured in any proper manner to form an air-tight joint therewith, the upper end of the said receiver $D^2$ being also closed by a proper-shaped disk or plate, E, resting upon its edge, and fixed posts or standards F around the outside of the receiver, the lower ends of which posts are secured to the platform C, upon which the receiver is placed. This cover E to the upper end of the receiver is made to form an air-tight joint therewith in any suitable manner, and is secured upon the several posts F on which it is placed, and rests by means of nuts G screwing upon their upper ends.

The central portion, P, of the bottom plate, H, of the receiver D is open, in and around which fits air-tight the edge of the central raised portion I of the horizontal plate J, arranged so as to freely slide upon two vertical projecting rods, K, of the under side of the upper platform, C, at points diametrically opposite to each other, and provided with adjustable screw-collars L upon their lower ends.

M is a shaft extending from the center of the under side of the plate J or cover for the opening in the bottom of the receiver $D^2$, of which it forms a part, downward and through the lower platform, A, of the apparatus. Around this shaft, between the plate J of its upper end and the top of the platform A, a spiral spring, N, is placed, which, being compressed by moving said plate J downward from the bottom of the receiver, causes the same to be immediately thrown or moved up toward the same and to be there held in close contact, forming an air-tight joint in and around its opening P.

Through the center of the upper plate or cover of the receiver $D^2$ extends a vertical cylindrical tube or casing, Q, suitably packed to form an air-tight joint therewith, the upper end of which tube is hung on the center of a horizontal cross bar or head, R, above the receiver, placed loosely over, near each of its ends, but at equal distances from the center of the receiver, uprights or standards S of the upper horizontal platform, on which it slides, resting upon a spiral spring, T, around each of the same.

U are parallel vertical rods extending from the outer ends of the cross-head R, to which they are secured, down through suitable apertures of both of the platforms, A and C, under the lower one of which they are connected together by a horizontal cross-bar, V, upon the upper side of which rests a treadle-lever, W, projecting at one end from the front side of the apparatus, but at its other hung upon a fulcrum, X, of the under side of the lower platform, A, by depressing the outer or projecting end of which lever or treadle W the cross-head R, above the receiver, is made to move downward through the connecting parts above explained, and thus the hollow tube or casing Q, hung in such cross-head and extending through the top plate of the receiver $D^2$, made to enter the interior of the same, from which, by removing the pressure upon the treadle, it is withdrawn into the box portion Y of the coverplate thereof by the action of the spiral springs T, compressed by such depression of the crosshead R.

In the upper end of this tube or casing Q, at the center of the cross-head R, is screwed the collar Z upon the handle portion $A^2$ of the soldering-iron $B^2$, this tube answering the same purpose thereto as the "shield," so called, described in the schedule annexed to the Letters Patent granted to W. K. Lewis on the 30th day of May, 1865, for improvements in soldering-irons.

$C^2$ is a pipe communicating with the interior of chamber or receiver $D^2$ through its upper plate or cover, to which tube it is intended to attach an air-pump, or any other suitable apparatus which will exhaust the air from the interior of the said receiver, and thus produce a vacuum, or partially so, therein when properly closed upon all sides or made air-tight.

$D^3$ is another pipe, also communicating with interior of receiver $D^2$ through its cover or upper plate, to which pipe a barometer or other suitable device or implement is intended to be secured for the purpose of indicating the amount of vacuum produced in the receiver $D^2$ by means of the air-pump or other apparatus used therefor; and $E^2$, a pipe in which it is intended to arrange a stop-cock, by opening which such vacuum can be destroyed.

Having thus described the construction and arrangement of one form of apparatus by which our improved mode of hermetically sealing fruit and other vessels may be carried out, we will now proceed to explain the manner in which the same is used therefor.

The can or other vessel that contains the fruit, meat, or other substance, whether in its natural state or cooked by means of heat or in any other proper manner, which it is desired to preserve from decay is first suitably prepared for being sealed by means of a soldering-iron, and then placed in the proper position upon the bottom plate of the receiver $D^2$, which for that purpose is drawn down therefrom, when, the said plate being allowed to rise through the action of the springs upon which it rests, the fruit or other vessel placed upon it is carried up with it through the opening of the lower end of the receiver into the same, the said bottom plate coming to an airtight bearing in and around the said opening. The soldering-iron is then unscrewed from its tube or casing and heated to the requisite degree for soldering, when, being replaced within the said tube and the stop-cock of the pipe $E^2$ closed, the air-pump, which is to be connected to pipe $C^2$, is then worked in the proper manner to exhaust the air contained in the receiver D, at the same time similarly exhausting the air of the vessel having the fruit or other substance until the requisite or desired degree or amount of vacuum is produced, as denoted by the vacuum-gage employed therefor, when, depressing or bearing down upon the treadle through the connecting parts above explained, the soldering-iron is made to travel downward, and, entering the receiver D, come in contact by its heated end with the fruit or other vessel therein and thus seal it, for which purpose it is intended that the said vessel shall be properly placed upon the bottom plate of the receiver, after which, the pressure upon the treadle being removed, the soldering-iron is withdrawn from contact with the fruit or other vessel and the stop-cock of the pipe $E^2$ opened, destroying the vacuum within the receiver, from which the fruit or other vessel is then removed by lowering the bottom plate of the same, and the apparatus made ready for another similar operation, the fruit-vessel thus sealed, when removed, being either subjected to the action of heat by immersing it in heated water or in any other proper manner, or not, according as may be desired or deemed best, this heating of the vessel producing a carbonization, as is supposed, of the air remaining in the same, and thus preventing the beginning of decomposition of its contents.

From the above it is plain to be seen that with the apparatus described we are enabled to hermetically seal a vessel containing fruit or other substance which it is desired to preserve from decomposition while *in vacuo*, the importance of which is so manifest to all experienced or conversant with the preservation of all articles of food and other substances as to need no special mention herein.

Although we have herein described one form of apparatus by which our improved mode of hermetically sealing fruit and other vessels containing fruit, &c., can be carried out, we do not intend to limit ourselves to any one particular form of apparatus for accomplishing the same, as it may be varied in many features and rendered capable of sealing more than one vessel at one and the same time, the present invention simply consisting in hermetically sealing cans or other vessels in which fruits or other substances are placed for being preserved from decay while such vessels are in a chamber or receiver from which the air is exausted in any proper manner, and a vacuum thus produced therein to the required or desired degree.

It may be here remarked, in conclusion, that the fruit or other substance contained in the can or other vessel, while in the air-tight chamber or receiver provided therefor, from which the air is exhausted, as explained, and previous to its vessel being sealed, can be, if so desired, charged with gas, steam, or other vapor to any degree of pressure required and then sealed, it being only necessary, as is obvious, for this purpose to connect with the receiver any suitable force-pump therefor.

Having thus described our invention, what we claim as new, and desire to secure by Letters Patent, is—

Hermetically sealing a vessel or vessels containing fruit or any other article of food or other substance, whether in its natural state or treated by heat or cooked, or in any other proper manner prepared, while in a chamber or chambers or receivers from which the air has been exhausted, and a vacuum, or partially so, produced, substantially as herein described, and for the purpose specified.

W. K. LEWIS.
J. W. BAILEY.

Witnesses:
JOHN MORRILL,
JOHN FIFIELD.